United States Patent
Ohashi et al.

(10) Patent No.: US 12,462,799 B2
(45) Date of Patent: Nov. 4, 2025

(54) VOICE CONTROL METHOD, SERVER APPARATUS, AND UTTERANCE OBJECT

(71) Applicant: Panasonic Intellectual Property Management Co., Ltd., Osaka (JP)

(72) Inventors: Yoshiki Ohashi, Osaka (JP); Satoru Matsunaga, Osaka (JP); Masafumi Torikai, Osaka (JP); Kazuhiro Kuroyama, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 616 days.

(21) Appl. No.: 17/782,139

(22) PCT Filed: Jul. 15, 2021

(86) PCT No.: PCT/JP2021/026612
§ 371 (c)(1),
(2) Date: Jun. 2, 2022

(87) PCT Pub. No.: WO2022/180882
PCT Pub. Date: Sep. 1, 2022

(65) Prior Publication Data
US 2023/0117212 A1    Apr. 20, 2023

(30) Foreign Application Priority Data
Feb. 25, 2021  (JP) ................. 2021-029247

(51) Int. Cl.
*G10L 15/22*    (2006.01)
*G10L 15/30*    (2013.01)

(52) U.S. Cl.
CPC .............. *G10L 15/22* (2013.01); *G10L 15/30* (2013.01)

(58) Field of Classification Search
None
See application file for complete search history.

(56) References Cited

U.S. PATENT DOCUMENTS

| | | | |
|---|---|---|---|
| 9,916,839 B1 * | 3/2018 | Scalise | G10L 15/22 |
| 2014/0074483 A1 * | 3/2014 | van Os | G10L 15/22 704/275 |

(Continued)

FOREIGN PATENT DOCUMENTS

| | | |
|---|---|---|
| JP | 2009-265278 A | 11/2009 |
| JP | 2011-163778 A | 8/2011 |

(Continued)

OTHER PUBLICATIONS

Japanese Office Action dated Jan. 31, 2023 issued in the corresponding Japanese Patent Application No. 2021-576424.

(Continued)

*Primary Examiner* — Richemond Dorvil
*Assistant Examiner* — Alexander G Marlow
(74) *Attorney, Agent, or Firm* — Rimon P.C.

(57) ABSTRACT

A voice control method according to the present disclosure includes: judging, for each of a plurality of utterance objects capable of outputting voice, whether the utterance object is outputting voice; and based on a result of the judging, causing one or more of the plurality of utterance objects to output voice at one of a timing of immediately outputting voice and a timing of outputting voice after an end of outputting voice by an utterance object which is outputting voice among the plurality of utterance objects.

8 Claims, 9 Drawing Sheets

(56) References Cited

U.S. PATENT DOCUMENTS

| | | | |
|---|---|---|---|
| 2015/0032364 A1* | 1/2015 | Yamaguchi | G10L 13/027 |
| | | | 701/400 |
| 2017/0330565 A1* | 11/2017 | Daley | G10L 17/00 |
| 2018/0025727 A1* | 1/2018 | Kume | G10L 17/22 |
| | | | 704/275 |
| 2018/0174406 A1* | 6/2018 | Arashi | G08B 3/10 |
| 2020/0225817 A1* | 7/2020 | Coffman | E04F 13/0864 |
| 2020/0320994 A1* | 10/2020 | Totsuka | G10L 17/22 |
| 2021/0335348 A1* | 10/2021 | Aggarwal | G06F 3/167 |

FOREIGN PATENT DOCUMENTS

| | | | | |
|---|---|---|---|---|
| JP | 2015-164251 A | 9/2015 | | |
| JP | 2016-224393 A | 12/2016 | | |
| JP | 2017-69836 A | 4/2017 | | |
| JP | 2017069836 A | * 4/2017 | | G06F 3/167 |
| WO | 2019/087546 A1 | 5/2019 | | |

OTHER PUBLICATIONS

International Search Report issued on Sep. 21, 2021 in International Patent Application No. PCT/JP2021/026612.

* cited by examiner

VOICE CONTROL METHOD, SERVER APPARATUS, AND UTTERANCE OBJECT

CROSS-REFERENCE TO RELATED APPLICATIONS

This application is the U.S. National Phase under 35 U.S.C. § 371 of International Patent Application No. PCT/JP2021/026612, filed on Jul. 15, 2021, which in turn claims the benefit of Japanese Patent Application No. 2021-029247, filed on Feb. 25, 2021, the entire disclosures of which Applications are incorporated by reference herein.

TECHNICAL FIELD

The present disclosure relates to a voice control method, a server apparatus, and an utterance object.

BACKGROUND ART

Conventionally, there has been an apparatus that outputs voice (i.e., makes utterance) among electronic devices such as a home appliance (see, for example, Patent Literature (PTL) 1).

PTL 1 discloses a server apparatus that creates voice data allowing an electronic device to make utterance on the basis of characteristic information that is set based on at least one of attribute information of a user of the electronic device or attribute information of the electronic device.

CITATION LIST

Patent Literature

[PTL 1] Japanese Unexamined Patent Application Publication No. 2015-164251

SUMMARY OF INVENTION

Technical Problem

For example, there are systems that notify users of information on electrical appliances via voice, such as the system including the server apparatus disclosed by PTL 1. It is required for this type of system that the information is easy to hear for the user. In order to achieve this, an utterance object that notifies the user of information via voice needs to notify the user of the information via voice at an appropriate timing.

The present disclosure provides a voice control method, etc. that enables an utterance object to notify information via voice at an appropriate timing.

Solution to Problem

A voice control method according to one aspect of the present disclosure includes: judging, for each of a plurality of utterance objects capable of outputting voice, whether the utterance object is outputting voice; and based on a result of the judging, causing one or more of the plurality of utterance objects to output voice at one of a timing of immediately outputting voice and a timing of outputting voice after an end of outputting voice by an utterance object which is outputting voice among the plurality of utterance objects.

In addition, a server apparatus according to one aspect of the present disclosure includes: a judging section that judges, for each of a plurality of utterance objects capable of outputting voice, whether the utterance object is outputting voice; and an outputter that causes, based on a result of judging by the judging section, one or more of the plurality of utterance objects to output voice at one of a timing of immediately outputting voice and a timing of outputting voice after an end of outputting voice by an utterance object which is outputting voice among the plurality of utterance objects.

In addition, an utterance object according to one aspect of the present disclosure includes: a voice outputter that outputs voice; a communicator for communicating with a server apparatus; and a voice controller that causes the voice outputter to output voice, based on voice information received from the server apparatus via the communicator. In the utterance object, the voice controller: transmits voice output information to the server apparatus via the communicator, the voice output information indicating whether the voice outputter is being caused to output voice; receives the voice information and timing information from the server apparatus via the communicator, the timing information indicating a timing of outputting voice; and causes the voice outputter to output voice based on the voice information at a timing based on the timing information received.

It should be noted that these generic and specific aspects may be implemented using a system, a method, an integrated circuit, a computer program, or a computer-readable recording medium such as a compact disc-read only memory (CD-ROM), and may also be implemented by any combination of systems, methods, integrated circuits, computer programs, and recording media.

Advantageous Effects of Invention

According to the present disclosure, it is possible to provide a voice control method, etc. that enable an utterance object to notify information via voice at an appropriate timing.

DESCRIPTION OF EMBODIMENTS

The following describes in detail an embodiment according to the present disclosure, with reference to the drawings. It should be noted that each of the embodiments described below shows a specific example of the present disclosure. The numerical values, shapes, materials, structural components, the arrangement and connection of the structural components, steps, the processing order of the steps, etc. presented in the following embodiments are mere examples, and therefore do not limit the present disclosure. Furthermore, among the structural components in the following embodiments, components not recited in the independent claims which indicate the broadest concepts of the present disclosure are described as arbitrary structural components.

The drawings are schematic diagrams and do not necessarily give strict illustration. Furthermore, in the respective diagrams, the same numerical sign is given to identical structural components.

EMBODIMENT

Configuration

Figure 1:
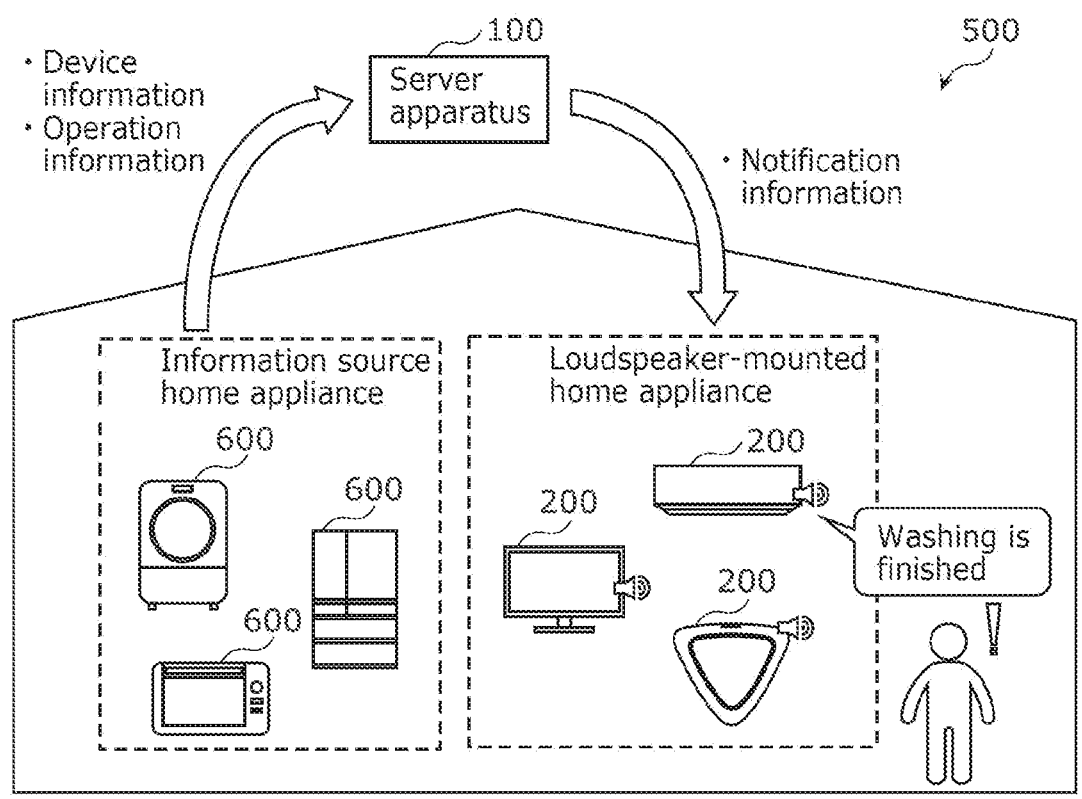
FIG. 1 is a schematic diagram illustrating a specific configuration of a voice utterance system according to an embodiment.

FIG. 1 is a schematic diagram illustrating a specific configuration of voice utterance system 500 according to an embodiment.

Voice utterance system 500 is an apparatus that notifies (outputs) a user of information via voice (in other words, utters the information) when the information such as information indicating a change in processing state, information notifying a failure, information for prompting the user to replace parts such as filters, and information notifying the user of functions of device 600 (recommendation notification) is output from device 600. For example, suppose that device 600 is a washing machine and that the washing is finished. In this case, for example, device 600 transmits operation information indicating that the washing is finished to server apparatus 100. When the operation information is received, server apparatus 100 transmits, to utterance object 200 which is a device capable of outputting voice, a voice file (voice data) for outputting an utterance sentence such as "Washing is finished" via voice, for example. Utterance object 200 includes, for example, a device such as a loudspeaker for outputting voice, and outputs via voice (i.e., utters) an utterance sentence such as "Washing is finished", based on the received voice file.

Voice utterance system 500 includes one or more devices 600, server apparatus 100, and one or more utterance objects 200.

Device 600 is an electrical appliance or the like, such as a refrigerator, a washing machine, a microwave oven, a lighting device, a door phone, etc., which is capable of outputting information of device 600 (information source device). To be more specific, for example, device 600 is a communication-capable electrical appliance (home appliance) in a home of a user. Device 600 transmits to server apparatus 100, for example, identification information which is a unique identifier indicating device 600, device information indicating the performance (specifications), etc. of device 600, operation information indicating details of processing (operation) of device 600, and state information indicating the state of device 600 such as failure, etc. It should be noted that the operation information may include device information that indicates device 600 that has performed the operation details indicated by the operation information.

In addition, for example, device 600 transmits information indicating a user of device 600 to server apparatus 100. The information indicating the user is received from the user via a reception unit that is included by device 600 and receives an input from the user. An example of the not-illustrated reception unit includes a touch panel.

Device 600 is, for example, a device different from a mobile terminal such as a smartphone. More specifically, device 600 is, for example, a device that can be used by a plurality of users (e.g., assumed to be used by a plurality of users), unlike a mobile terminal.

Mobile terminals such as smartphones, etc. have a specific user who uses them. For that reason, when notifying information to a user by a mobile terminal, even if the mobile terminal notifies the user of other information, it is assumed that the user of the mobile terminal is the only user who is the target of the notification, i.e., the mobile terminal is exclusively used by the user. Accordingly, even in the case where a plurality of notifications are to be notified to the user, the mobile terminal only needs to make the plurality of notifications in order.

On the other hand, home appliances are not necessarily exclusively used by the user who is the target of the notification, such as the case where the home appliances are shared by family members. There is a possibility that the home appliances are exclusively used by other users. For that reason, in order to notify a specific user of information about device 600 which is such a home appliance as described above, there is a problem that it is necessary to withhold notification when device 600 is exclusively used by someone other than the user.

In view of the above, in voice utterance system 500, in order to appropriately notify the user of device 600 of information about device 600, for example, device 600 transmits information indicating the user of device 600 to server apparatus 100 along with device information, operation information, etc. of device 600.

Device 600 includes, for example, a communication interface for communicating with server apparatus 100, an execution unit that executes processes such as refrigeration, washing, heating, etc., a detection unit implemented by a sensor, etc., for detecting the state of device 600, and a control unit implemented by a processor, memory, etc., for controlling various processes of device 600.

Server apparatus 100 determines, based on the information received from device 600, an utterance sentence (scenario) to be output by utterance object 200, and causes utterance object 200 to output the created utterance sentence via voice. For example, when operation information is received from device 600, server apparatus 100 selects a voice file (voice data) corresponding to the operation information, and transmits the selected voice file to utterance object 200 as notification information (also referred to as voice information), thereby causing utterance object 200 to output voice based on the voice file.

Examples of the utterance sentence include a sentence indicating that device 600 has started an operation, a sentence indicating that device 600 has finished an operation, a sentence indicating that device 600 has operated in conjunction with another device 600, a sentence to prompt the user to perform version upgrade, a sentence to recommend the user to use a function of device 600, a sentence indicating an occurrence of failure, etc.

Server apparatus 100 is implemented by a computer including, for example, a communication interface for communicating with devices such as device 600 and utterance object 200, non-volatile memory in which a program is stored, volatile memory that is a temporary storage region for executing the program, input and output ports for transmitting and receiving signals, a processor for executing the program, etc.

Utterance object 200 is an electrical appliance or the like, such as an air conditioner, a television set, an autonomous-travelling vacuum cleaner (so-called robot vacuum cleaner), etc., and is a device (loudspeaker-mounted home appliance) including a component capable of outputting sound, such as a loudspeaker, etc.

Utterance object 200, for example, when receiving voice information such as a voice file from server apparatus 100, outputs voice based on the received voice information.

It should be noted that, although FIG. 1 illustrates three devices 600, the total number of devices 600 included by voice utterance system 500 is not particularly limited, and thus one device 600 or a plurality of devices 600 may be included.

In addition, although FIG. 1 illustrates three utterance objects 200, the total number of utterance objects 200 included by voice utterance system 500 is not particularly limited, and thus one utterance object 200 or a plurality of utterance objects may be included.

Server apparatus 100 is communicably connected to each of three devices 600 and three utterance objects 200 via a network such as the Internet.

Server apparatus 100 may be connected to each of the three devices 600 and the three utterance objects 200 via a local area network (LAN) or the like, or may be wirelessly communicably connected.

In addition, the communication standard used for communication between server apparatus 100 and each of the three devices 600 and the three utterance objects 200 is not specifically limited. Examples of the communication standard include Wi-Fi (registered trademark), Bluetooth (registered trademark), ZigBee (registered trademark), or the like.

Each of the three devices 600 and the three utterance objects 200 is located, for example, in a house where a user lives. In addition, server apparatus 100 is located outside the house, for example.

Figure 2:
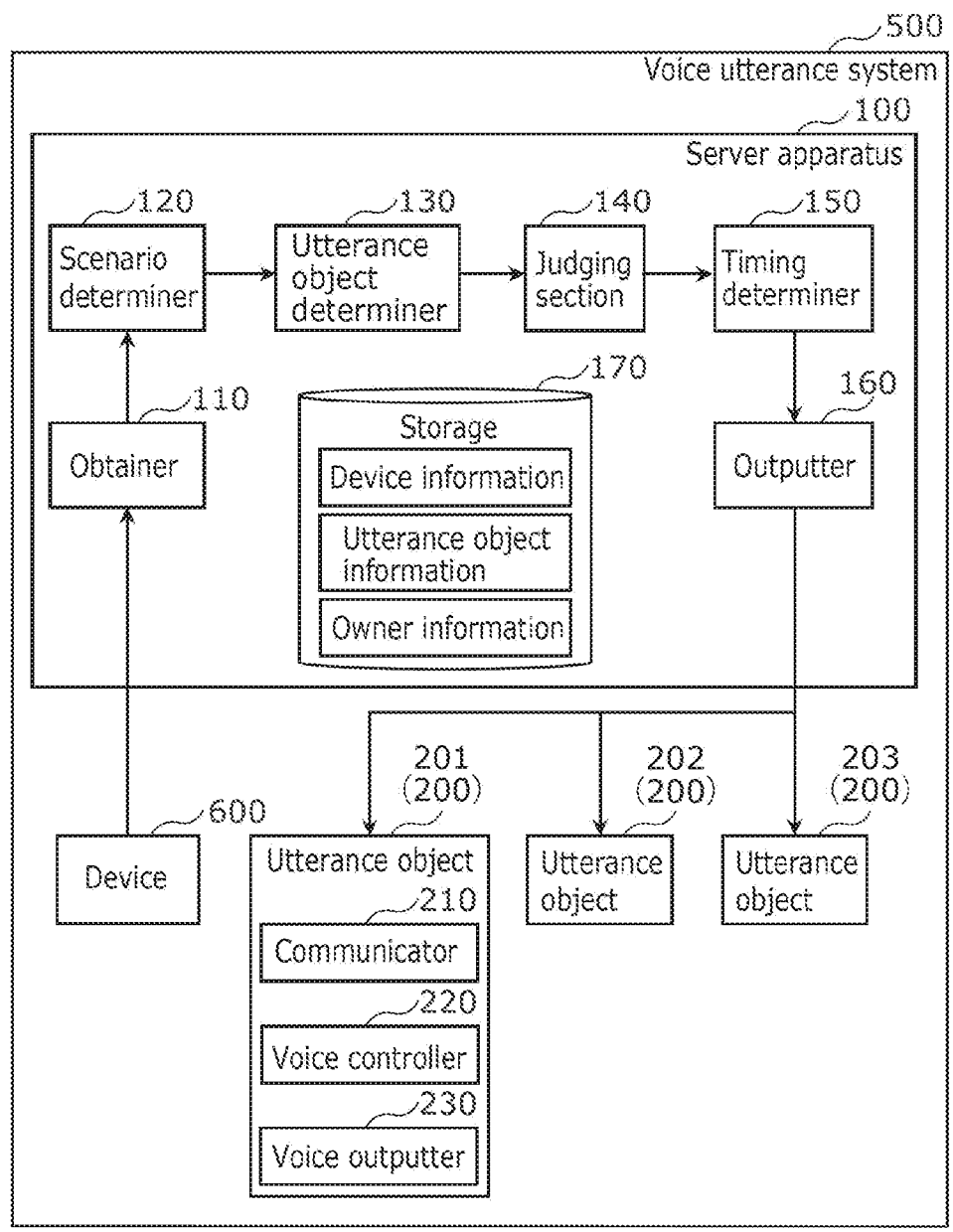
FIG. 2 is a block diagram illustrating a configuration of a server apparatus according to the embodiment.

FIG. 2 is a block diagram illustrating server apparatus 100 according to the embodiment. It should be noted that FIG. 2 illustrates three utterance objects 200 and only one device 600 as a representative, and reference numerals 201, 202, and 203 are assigned to the three utterance objects 200 in order to distinguish the three utterance objects 200.

Server apparatus 100 includes obtainer 110, scenario determiner 120, utterance object determiner 130, judging section 140, timing determiner 150, outputter 160, and storage 170.

Obtainer 110 is a processing unit that obtains information on device 600. The information on device 600 includes device information such as the performance, type, and model number of device 600, operation information that indicates the operation history (details of the past operation) of device 600, etc. Obtainer 110 obtains device information and/or operation information, for example, by communicating with device 600 via a communicator such as a communication interface that is included by server apparatus 100 and not illustrated in the diagram. The communicator is, for example, a communication interface for communicating with device 600 and utterance object 200. For example, in the case of wired communication with utterance object 200 and device 600, the communicator is implemented by a connector, etc. to which communication lines are connected, and in the case of wireless communication, the communicator is implemented by an antenna and wireless communication circuit, etc.

It should be noted that, when server apparatus 100 includes a reception device such as a mouse, keyboard, etc. that receives an input from a user, the device information and/or operation information may be obtained via the reception device.

Obtainer 110 causes storage 170 to store the obtained device information and operation information, or outputs the obtained device information and operation information to scenario determiner 120.

Scenario determiner 120 is a processing unit that determines whether the operation information obtained by obtainer 110 satisfies a predetermined condition, and determines an utterance sentence to be uttered by utterance object 200. More specifically, scenario determiner 120 determines whether an event that causes utterance object 200 to output voice has occurred, based on the operation information obtained by obtainer 110. For example, the operation details corresponding to the type of device 600 which is determined that an event has occurred (i.e., the predetermined condition is satisfied) are stored in storage 170. For example, scenario determiner 120 determines whether an event that causes utterance object 200 to output voice has occurred, by determining whether the operation details indicated by the operation information obtained by obtainer 110 match the operation details which are stored in storage 170 and correspond to the type of device 600 which is determined that an event has occurred.

Examples of the predetermined condition include: device 600 has started an operation, device 600 has finished an operation, device 600 has operated in conjunction with other devices 600, device 600 can be version upgraded, device has broken down, etc.

It should be noted that the predetermined condition may be determined arbitrarily in advance.

For example, when determining that operation details indicated by the operation information obtained by obtainer 110 satisfy a predetermined condition, scenario determiner 120 determines an utterance sentence corresponding to the operation information. For example, an utterance sentence that is associated with operation details is stored in storage 170, and scenario determiner 120 determines an utterance sentence to be output by utterance object 200 via voice, by selecting the utterance sentence associated with the operation details indicated by the operation information.

Utterance object determiner 130 is a processing unit that determines which of the plurality of utterance objects 200 is to be caused to output the utterance sentence determined by scenario determiner 120 via voice. For example, device information indicating device 600 and utterance object information indicating utterance object 200 are stored in association with each other in storage 170 in advance. For example, in the case where device information of a first device, which is one example of device 600, is associated with utterance object information of utterance objects 201 and 202, when the operation information of the first device is obtained by obtainer 110, utterance objects 201 and 202 output an utterance sentence corresponding to the operation information via voice. In addition, for example, in the case where device information of a second device, which is another example of device 600, is associated with utterance object information of utterance object 201, when the operation information of the second device is obtained by obtainer 110, utterance object 201 outputs an utterance sentence corresponding to the operation information via voice.

In addition, for example, owner information indicating an owner of device 600 and utterance object 200 is stored in association with the device information and the utterance object information in storage 170. In this case, for example, when obtainer 110 obtains the operation information of device 600, utterance object determiner 130 determines utterance object 200 so as to cause utterance object 200 whose owner is the same as the owner of device 600 to output an utterance sentence corresponding to the operation information via voice. As described above, for example, utterance object determiner 130 determines which of the plurality of utterance objects 200 included by voice utterance system 500 is to be caused to output the utterance sentence determined by scenario determiner 120 via voice, based on the device information, the utterance object information, and the owner information.

It should be noted that the owner information may be stored in storage 170 in advance. Alternatively, for example, obtainer 110 may obtain the owner information received from the user by a reception device such as a smartphone which is not illustrated via the above-described communicator which is not illustrated, and cause storage 170 to store the obtained owner information.

Judging section 140 is a processing unit that judges, for each of the plurality of utterance objects 200, whether utterance object 200 is outputting voice. For example, judging section 140 judges whether each of utterance object 201, utterance object 202, and utterance object 203 is outputting voice.

It should be noted that whether the plurality of utterance objects 200 are outputting voice here indicates, for example, whether server apparatus 100 causes utterance object 200 to output an utterance sentence via voice. For example, there are instances where utterance object 200 outputs voice to notify information about utterance object 200 itself, or where utterance object 200 outputs voice to accompany video in the case of utterance object 200 being a television set. As described above, the voice that is output by utterance object 200 that is judged by judging section 140 may, but not necessarily, include voice other than the voice which server apparatus 100 causes utterance object 200 to output (voice based on the utterance sentence).

For example, judging section 140 judges whether each of utterance object 201, utterance object 202, and utterance object 203 is caused to output the utterance sentence determined by scenario determiner 120 via voice. For example, judging section 140 judges whether each of utterance object 201, utterance object 202, and utterance object 203 is outputting voice, on the basis of the timing determined by timing determiner 150 which will be described later and the length of the utterance sentence determined by scenario determiner 120. The output time of voice according to the length of the utterance sentence may be stored in storage 170 in advance, for example, or information indicating the time, etc. to be taken for outputting one voice item may be stored in storage 170 in advance, and the time to be taken for outputting the utterance sentence via voice may be calculated based on the information and the utterance sentence. Alternatively, judging section 140 may obtain information (voice output information) indicating whether each of utterance object 201, utterance object 202, and utterance object 203 is making utterance, by communicating with each of utterance object 201, utterance object 202, and utterance object 203 via the above-described communicator which is not illustrated and is included by the above-described server apparatus 100.

Timing determiner 150 is a processing unit that selects, based on the result of the judgment performed by judging section 140, one of a timing of immediately outputting voice and a timing of outputting voice after the end of outputting voice by utterance object 200 which is outputting voice, for causing one or more of a plurality of utterance objects 200 to output voice.

For example, in the case where utterance object determiner 130 determines to cause a plurality of utterance objects 200 to output an utterance sentence (more specifically, the same utterance sentence) via voice, timing determiner 150 selects: a timing of immediately outputting voice for causing a first utterance object that is not outputting voice among the plurality of utterance objects 200; and for a second utterance object that is outputting voice among the plurality of utterance objects 200, a timing of outputting voice after the end of outputting voice by the second utterance object.

Alternatively, for example, in the case where utterance object determiner 130 determines to cause a plurality of utterance objects 200 to output an utterance sentence (more specifically, the same utterance sentence) via voice, timing determiner 150 selects, when at least any one of utterance objects 200 among the plurality of utterance objects 200 is outputting voice, the timing of outputting voice after the end of outputting voice by the at least any one of utterance objects 200, for causing the one or more of the plurality of utterance objects 200 to output voice.

Alternatively, for example, timing determiner 150: obtains owner information that indicates an owner of each of the plurality of utterance objects 200; and when utterance object 200 owned by an owner of one or more of the plurality of utterance objects 200 to be caused to output voice is outputting voice, selects a timing of outputting voice after the end of outputting voice by utterance object 200 owned by an owner of one or more of the plurality of utterance objects 200 to be caused to output voice, for causing the one or more of the plurality of utterance objects 200 to output voice.

In this case, for example, when utterance object 200 owned by the owner of the one or more of the plurality of utterance objects 200 to be caused to output the utterance sentence via voice is outputting voice, timing determiner 150 selects the timing of outputting voice after the end of outputting voice by utterance object 200 owned by the owner of the one or more of the plurality of utterance objects 200 to be caused to output the utterance sentence via voice, for causing the one or more of the plurality of utterance objects 200 to output voice. The owner is a user who is a target of an utterance sentence to be output via voice. For example, when operation information is obtained from device 600, in order to notify an utterance sentence based on the obtained operation information to a user who is the owner of device 600, server apparatus 100 causes utterance object 200 owned by the user who is the target (notification target) of the utterance sentence; that is, utterance object 200 owned by the same owner as device 600, to output the utterance sentence via voice. In such a case, for example, timing determiner 150 determines, based on whether utterance object 200 (e.g., utterance object 202) owned by the same user as one or more utterance objects 200 (e.g., utterance object 201) to be caused to output an utterance sentence via voice is outputting voice, the timing of causing the one or more utterance objects 200 (e.g., utterance object 201) to output voice.

Alternatively, for example, timing determiner 150: obtains owner information that indicates an owner of each of the plurality of utterance objects 200; and when (i) one or more of the plurality of utterance objects 200 to be caused to output voice are owned by a first user and a second user, and (ii) utterance object 200 owned by at least one of the first user or the second user among a plurality of utterance objects 200 is outputting voice, selects a timing of outputting voice after the end of outputting voice by utterance object 200 owned by the at least one of the first user or the second user, for causing one or more of the plurality of utterance objects 200 owned by at least one of the first user or the second user to output voice.

Alternatively, for example, timing determiner 150: obtains owner information that indicates an owner of each of the plurality of utterance objects 200; and when (i) one or more of the plurality of utterance objects 200 to be caused to output voice are owned by a first user of the first user and a second user, (ii) the second user owns at least any one of one or more utterance objects 200 owned by the first user among the plurality of utterance objects 200, and (iii) one or more utterance objects owned by the second user are outputting voice, selects the timing of outputting voice after the end of outputting voice by the one or more utterance objects owned by the second user, for causing the one or more of the plurality of utterance objects 200 to be caused to output voice to output voice.

It should be noted that timing determiner 150 may cause outputter 160, which will be described later, to output, as timing information, information indicating that voice is to be output immediately, or information indicating an instruction to output voice after waiting until utterance object 200 finishes outputting voice, along with voice information. Alternatively, for example, timing determiner 150 may cause outputter 160 to output, as timing information, information indicating a time at which voice is to be output, information indicating a time period from receiving voice information to outputting voice, etc., along with the voice information.

A specific example of the processing method by which timing determiner 150 determines the timing for causing utterance object 200 to output an utterance sentence via voice will be described later.

Outputter 160 is a processing unit that controls the output of voice by utterance object 200. More specifically, based on a result of determination performed by judging section 140, outputter 160 causes one or more of the plurality of utterance objects 200 to output voice at one of a timing of immediately outputting voice and a timing of outputting voice after an end of outputting voice by utterance object 200 which is outputting voice among the plurality of utterance objects 200. More specifically, outputter 160 causes at least one utterance object 200 determined by utterance object determiner 130 to output via voice an utterance sentence determined by scenario determiner 120 at a timing determined by timing determiner 150. For example, outputter 160 transmits (i) voice information which is information for causing at least one utterance object 200 to output the utterance sentence via voice, and (ii) timing information which indicates the timing determined by timing determiner 150, to the at least one utterance object 200 determined by utterance object determiner 130 via the above-described communicator which is not illustrated and is included by server apparatus 100.

The voice information is information for causing utterance object 200 to output via voice an utterance sentence corresponding to the operation information of device 600. For example, the voice information is a voice file (voice data) corresponding to the operation information of device 600. The voice file is, for example, stored in storage 170 in association with the operation details.

For example, outputter 160 obtains from storage 170 a voice file corresponding to the utterance sentence determined by scenario determiner 120 based on the operation information obtained by obtainer 110, and outputs (transmits) the obtained voice file to utterance object 200 as voice information.

In this manner, when the utterance sentence set (selected) by the user satisfies a predetermined condition (e.g., device 600 has performed a predetermined operation, entered a predetermined state, etc.), the utterance sentence is output as voice from at least one utterance object 200 determined by utterance object determiner 130 at the timing determined by timing determiner 150.

It should be noted that server apparatus 100 may receive the above-described voice information from a computer such as another server apparatus that is different from server apparatus 100. For example, storage 170 may store information indicating the uniform resource locator (URL) corresponding to the voice file. For example, after determining the utterance sentence, scenario determiner 120 may transmit information indicating the URL corresponding to the voice information according to the determined utterance sentence to the other server apparatus, thereby obtaining the voice information.

Each of the processing units including obtainer 110, scenario determiner 120, utterance object determiner 130, judging section 140, timing determiner 150, and outputter 160 are implemented by a memory, a control program stored in the memory, and a processor such as a central processing unit (CPU) that executes the control program. In addition, these processing units may be implemented by a single memory and a single processor, or by a plurality of memories and a plurality of processors in different or arbitrary combinations with each other. In addition, these processing units may also be implemented by a dedicated electronic circuit, for example.

Storage 170 is a storage device that stores device information indicating device 600, utterance object information indicating utterance object 200, owner information indicating the owner of device 600 and utterance object 200, and information indicating a plurality of utterance sentences (scenario information). In addition, storage 170 may also store a voice file corresponding to the utterance sentence.

Storage 170 is implemented by, for example, a hard disk drive (HDD), a flash memory, or the like.

It should be noted that, for example, storage 170 may store setting information indicating an utterance sentence to be output via voice. The setting information is information indicating the utterance sentence that has been set by the user to be output via voice, among one or more utterance sentences (more specifically, information indicating utterance sentences) stored in storage 170. Depending on users, there are instances where one information is desired to be notified via voice, while others need not to be notified via voice. In view of the above, for example, obtainer 110 obtains, as setting information, information indicating whether to output the utterance sentence received from the user by a reception device such as a smartphone which is not illustrated, via the above-described communicator which is not illustrated, and stores the obtained setting information in storage 170. For example, when obtainer 110 obtains the operation information, scenario determiner 120 may determine, based on the setting information stored in storage 170, whether to cause utterance object 200 to output the utterance sentence related to the operation information via voice. The setting information may be set for each user.

As described above, utterance object 200 is an electrical appliance such as an air conditioner, a television set, an autonomous-travelling vacuum cleaner, etc., and is a device including a component capable of outputting voice, such as a loudspeaker. Utterance object 200, for example, outputs voice based on the voice information such as the voice file received from server apparatus 100.

It should be noted that the utterance sentence and the voice file corresponding to the utterance sentence may be stored in an HDD or other storage unit which is not illustrated, and utterance object 200 may include the storage. In this case, for example, outputter 160 may transmit to utterance object 200, as voice information, information indicating an utterance sentence to be output by utterance object 200 via voice, or information indicating a voice file associated with the utterance sentence. In this case, for example, utterance object 200 selects a voice file for outputting voice from among one or more voice files stored in the storage, based on the received voice information, and outputs voice based on the voice file that has been selected.

Utterance object 200 includes, for example, a loudspeaker, an amplifier, a memory in which a control program for outputting voice from the loudspeaker based on voice information received from server apparatus 100 is stored, a processor for executing the control program, and a communication interface for communicating with server apparatus 100. For example, in the case of wired communication between utterance object 200 and server apparatus 100, the communication interface is implemented by a connector, etc. to which communication lines are connected, and in the case of wireless communication, the communication interface is implemented by an antenna and wireless communication circuit, etc.

Utterance object 200, for example, includes communicator 210, voice controller 220, and voice outputter 230.

Communicator 210 is a communication interface for performing communication with server apparatus 100.

Voice controller 220 is a processing unit that causes voice to be output from voice outputter 230, based on voice information received (obtained) from server apparatus 100 (more specifically, outputter 160) via communicator 210. More specifically, voice controller 220 transmits, to server apparatus 100 via communicator 210, voice output information indicating whether voice is being output from voice outputter 230, receives, from server apparatus 100 via communicator 210, voice information and timing information indicating a timing of causing voice to be output, and causes voice outputter 230 to output voice based on the voice information.

Voice controller 220 is implemented by a memory, a control program stored in the memory, and a processor such as a CPU that executes the control program. In addition, voice controller 220 may also be implemented by a dedicated electronic circuit, for example.

Voice outputter 230 is a device that outputs voice under control of voice controller 220. Voice outputter 230 is implemented by, for example, a loudspeaker, etc.

SPECIFIC EXAMPLES

Next, specific examples of the processing method by which timing determiner 150 determines the timing of causing utterance object 200 to output an utterance sentence via voice will be described. It should be noted that, in the first example to the fifth example described below, utterance object 201 and utterance object 202 are described assuming that user A is the owner. In addition, in the first example to the fifth example described below, utterance object 202 and utterance object 203 are described assuming that user B is the owner. In other words, utterance object 202 is shared by user A and user B. In addition, in the first example to the fifth example described below, the case where information is caused to be output via voice to user B is indicated.

First Example

Figure 3:
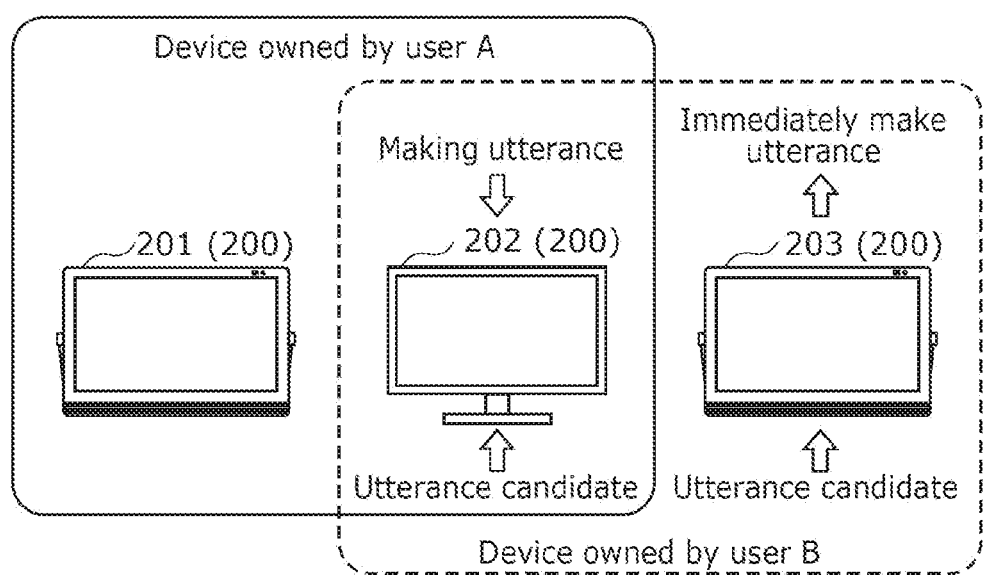
FIG. 3 is a diagram for explaining a first example of the processing method of determining a timing for the server apparatus according to the embodiment to cause an utterance object to output an utterance sentence via voice.

FIG. 3 is a diagram for explaining a first example of the processing method of determining a timing for server apparatus 100 according to the embodiment to cause utterance object 200 to output an utterance sentence via voice.

In the present example, it is assumed that utterance object 202 and utterance object 203 are to be caused to output an utterance sentence via voice, and utterance object 202 is outputting voice. In other words, in the present example, utterance object 202 and utterance object 203 are utterance candidates, and utterance object 202 is making utterance.

In this case, timing determiner 150 determines, for utterance object 202 which is making utterance, a timing such that voice is to be output after waiting until the end of the making utterance. On the other hand, timing determiner 150 determines, for utterance object 203 which is not uttering, a timing such that an utterance sentence is to be output immediately. For that reason, in the present example, utterance object 202 and utterance object 203, which utter the same utterance sentence, utter the utterance sentence at different timings.

As described above, in the first example, timing determiner 150 determines, (i) for a first utterance object that is not outputting voice among two or more utterance objects 200, a timing such that the first utterance object is caused to immediately output voice, and (ii) for a second utterance object that is outputting voice among the two or more utterance objects 200, a timing such that the second utterance object is caused to output voice after waiting until the end of the outputting of the voice.

It should be noted that utterance object 200 which is an utterance candidate may be owned by user A or user B, and the owner is not specifically limited. For example, in the case where information for user B is to be output via voice, it is sufficient if utterance object 200 is at least one of utterance object 202 or utterance object 203 owned by user B.

Second Example

Figure 4:
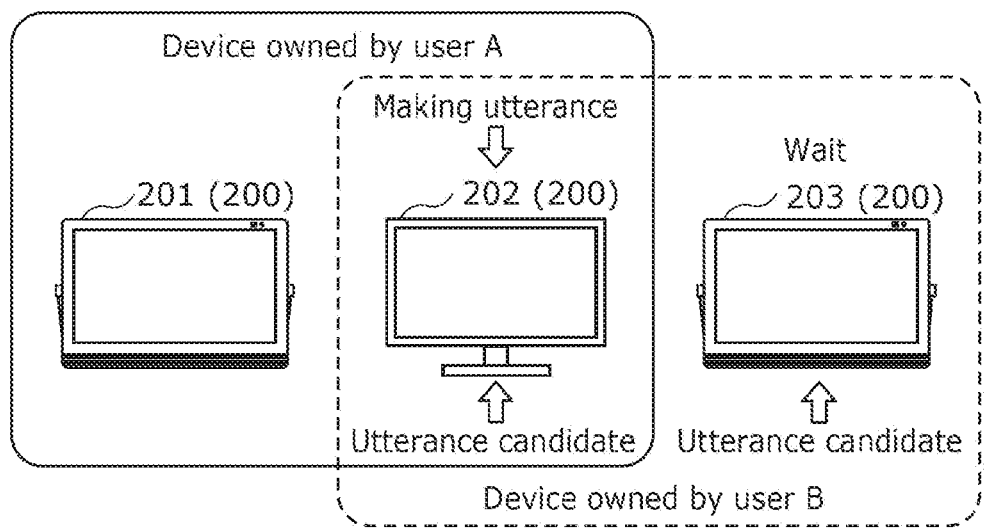
FIG. 4 is a diagram for explaining a second example of the processing method of determining a timing for the server apparatus according to the embodiment to cause the utterance object to output the utterance sentence via voice.

FIG. 4 is a diagram for explaining a second example of the processing method of determining a timing for server apparatus 100 according to the embodiment to cause utterance object 200 to output an utterance sentence via voice.

In the present example, it is assumed that utterance object 202 and utterance object 203 are to be caused to output an utterance sentence via voice, and utterance object 202 is outputting voice. In other words, in the present example, utterance object 202 and utterance object 203 are utterance candidates, and utterance object 202 is making utterance.

In this case, timing determiner 150 determines, for utterance object 202 which is making utterance, a timing such that utterance object 202 which is making utterance is to be caused to make utterance after waiting until the end of the making utterance. In addition, timing determiner 150 also determines, for utterance object 203 that is not making utterance, a timing such that utterance object 203 is to be caused to make utterance after waiting until the end of the making utterance by utterance object 202. For that reason, in the present example, utterance object 202 and utterance object 203, which utter the same utterance sentence, utter the utterance sentence at the same timing.

As described above, in the second example, when at least any one of the two or more utterance objects 200 each of which is an utterance candidate is outputting voice, timing determiner 150 determines a timing such that the two or more utterance objects 200 are to be caused to output voice after the end of outputting voice by the at least any one of the two or more utterance objects 200 (e.g., such that the same utterance sentence is to be output via voice at the same time).

Third Example

Figure 5:
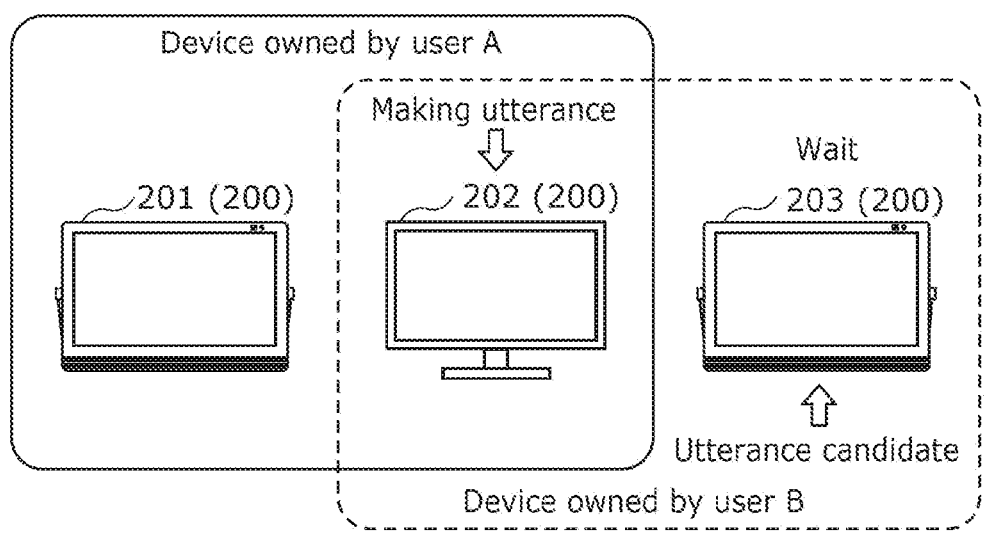
FIG. 5 is a diagram for explaining a third example of the processing method of determining a timing for the server apparatus according to the embodiment to cause the utterance object to output the utterance sentence via voice.

FIG. 5 is a diagram for explaining a third example of the processing method of determining a timing for server apparatus 100 according to the embodiment to cause utterance object 200 to output an utterance sentence via voice.

In the present example, it is assumed that utterance object 203 is to be caused to output an utterance sentence via voice, and utterance object 202 is outputting voice. In other words, in the present example, utterance object 203 is an utterance candidate, and utterance object 202 is making utterance.

In the present example, timing determiner 150 identifies utterance object 200 owned by user B who is an owner of utterance object 203, by obtaining the owner information of each of utterance object 201, utterance object 202, and utterance object 203. In the present example, timing determiner 150 identifies utterance object 202 owned by user B who is the owner of utterance object 203. In addition, for example, when utterance object 202, whose owner is same as the owner of utterance object 203 that is an utterance candidate, is making utterance, timing determiner 150 determines a timing such that utterance object 203 is to be caused to make utterance after the end of making utterance by utterance object 202. On the other hand, for example, timing determiner 150 determines a timing such that utterance object 203 is to be caused to make utterance immediately when utterance object 202 whose owner is the same as an owner of utterance object 203 which is an utterance candidate is not making utterance and utterance object 201 whose owner is different from the owner of utterance object 203 which is an utterance candidate is making utterance.

As described above, in the third example, timing determiner 150: obtains owner information that indicates an owner of each of the plurality of utterance objects 200; and when utterance object 200 owned by an owner of one or more of the plurality of utterance objects 200 to be caused to output voice is outputting voice among the plurality of utterance objects 200, determines a timing of causing the one or more of the plurality of utterance objects 200 to output voice after the end of outputting voice by utterance object 200 owned by the owner of one or more of the plurality of utterance objects 200.

It should be noted that, for example, judging section 140 may obtain the owner information of each of utterance object 201, utterance object 202, and utterance object 203, and determine (i) whether utterance object 203 and utterance object 202 which is owned by user B who is the owner of utterance object 203 are each making utterance, or (ii) whether each of utterance object 201, utterance object 202, and utterance object 203, which are all of the utterance objects included by voice utterance system 500, is making utterance.

Fourth Example

Figure 6:
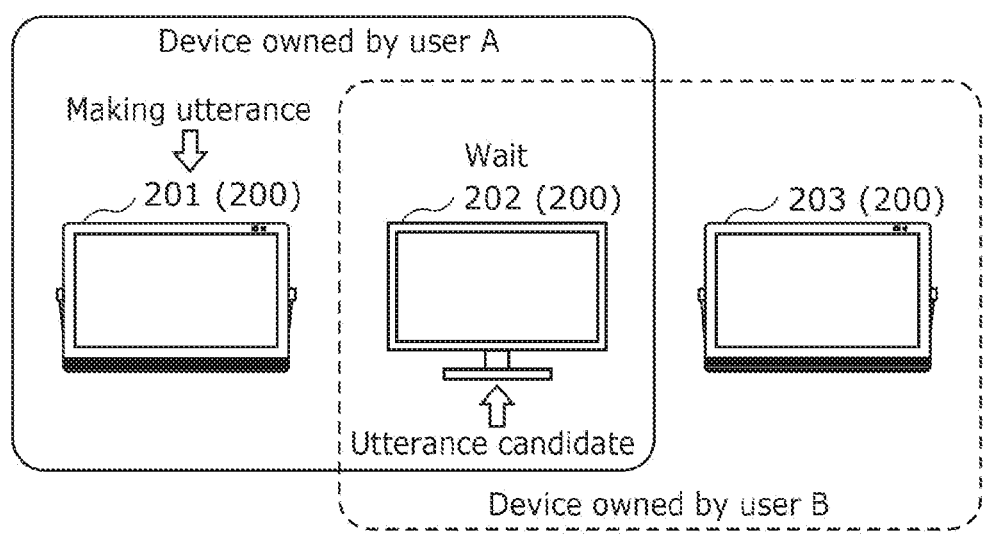
FIG. 6 is a diagram for explaining a fourth example of the processing method of determining a timing for the server apparatus according to the embodiment to cause the utterance object to output the utterance sentence via voice.

FIG. 6 is a diagram for explaining a fourth example of the processing method of determining a timing for server apparatus 100 according to the embodiment to cause utterance object 200 to output an utterance sentence via voice.

In the present example, it is assumed that utterance object 202 is to be caused to output an utterance sentence via voice, and utterance object 201 is outputting voice. In other words, in the present example, utterance object 202 is an utterance candidate, and utterance object 201 is making utterance.

In the present example, timing determiner 150 identifies utterance object 200 owned by at least one of user A or user B who own utterance object 202, by obtaining the owner information of each of utterance object 201, utterance object 202, and utterance object 203. In the present example, timing determiner 150 identifies utterance object 201 owned by user A who is the owner of utterance object 202, and utterance object 203 owned by user B who is the owner of utterance object 202. In addition, for example, when at least one of utterance object 201 or utterance object 203, each of which is owned by at least one of the owners of utterance object 202 that is an utterance candidate, is making utterance, timing determiner 150 determines a timing such that utterance object 202 is to be caused to make utterance after the end of making utterance by each of utterance object 201 and utterance object 203. In the present example, since utterance object 201, which is owned by at least one of the owners of utterance object 202 that is the utterance candidate, is making utterance, timing determiner 150 determines a timing such that utterance object 202 is to be caused to make utterance after the end of making utterance by utterance object 201. For that reason, in the present example, for example, when (i) utterance object 201, which is owned by at least one of the owners of utterance object 202 that is the utterance candidate, is not making utterance, and (ii) utterance object 203, which is owned by at least one of the owners of utterance object 202 that is the utterance candidate, is making utterance, timing determiner 150 determines a timing such that utterance object 202 is to be caused to make utterance after the end of making utterance by utterance object 203.

As described above, in the fourth example, timing determiner 150: obtains owner information that indicates an owner of each of the plurality of utterance objects 200; and when (i) one or more of the plurality of utterance objects 200 to be caused to output voice are owned by a first user and a second user, and (ii) utterance object 200 owned by at least one of the first user or the second user among the plurality of utterance objects 200 is outputting voice, determines the timing such that one or more of the plurality of utterance objects 200 owned by at least one of the first user or the second user is caused to output voice after the end of outputting voice by utterance object 200 owned by at least one of the first user or the second user among the plurality of utterance objects 200.

Fifth Example

Figure 7:
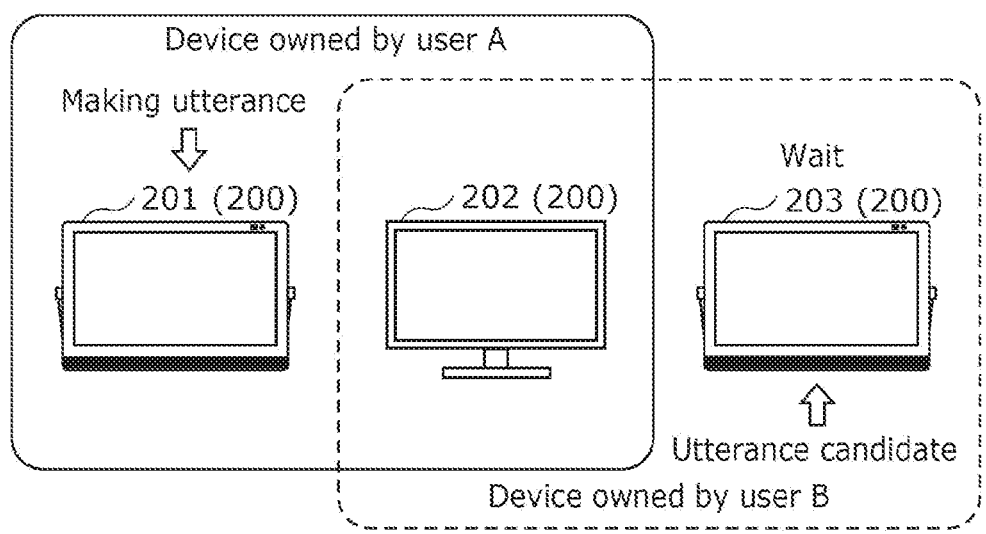
FIG. 7 is a diagram for explaining a fifth example of the processing method of determining a timing for the server apparatus according to the embodiment to cause the utterance object to output the utterance sentence via voice.

FIG. 7 is a diagram for explaining a fifth example of the processing method of determining a timing for server apparatus 100 according to the embodiment to cause utterance object 200 to output an utterance sentence via voice.

In the present example, it is assumed that utterance object 203 is to be caused to output an utterance sentence via voice, and utterance object 201 is outputting voice. In other words, in the present example, utterance object 203 is an utterance candidate, and utterance object 201 is making utterance.

In the present example, timing determiner 150 determines whether there is an owner other than user B for utterance object 203 and utterance object 202 owned by user B who owns utterance object 203, by obtaining the owner information of each of utterance object 201, utterance object 202, and utterance object 203. In the present example, utterance object 202 owned by user B is also owned by user A, and thus it is determined that there is an owner other than user B for utterance object 202 and utterance object 203 owned by user B. In addition, when timing determiner 150 determines that there is an owner other than user B for utterance object 202 and 203 owned by user B, timing determiner 150 identifies utterance object 200 owned by the owner other than user B. In the present example, timing determiner 150 identifies utterance object 201 owned by user A who is the owner other than user B, for utterance object 202 and utterance object 203 which are owned by user B. In addition, for example, when utterance object 200 that has been identified is making utterance, timing determiner 150 determines a timing such that utterance object 203 is to be caused to make utterance after the end of making utterance by utterance object 200 that has been identified. In the present example, since utterance object 201 that has been identified is making utterance, timing determiner 150 determines a timing such that utterance object 203 is to be caused to make utterance after the end of making utterance by utterance object 201 that has been identified.

As described above, in the fifth example, timing determiner 150: obtains the owner information indicating the owner of each of the plurality of utterance objects 200; and when (i) the one or more of the plurality of utterance objects 200 to be caused to output voice are owned by a first user (e.g., user B) of the first user and a second user (e.g., user A), (ii) the second user owns at least any one of one or more utterance objects 200 owned by the first user among the plurality of utterance objects 200, and (iii) one or more utterance objects 200 owned by the second user are outputting voice, determines the timing such that the one or more of the plurality of utterance objects 200 to be caused to output voice is to be caused to output voice after the end of outputting voice by the one or more utterance objects 200 owned by the second user.

It should be noted that the above-described first example, second example, third example, fourth example, and fifth example may be realized in any combination to the extent possible.

For example, in the above-described fifth example, when voice is to be output from one utterance object 200 owned by the first user, whether another utterance object 200 owned by the first user is making utterance may be determined. For example, when the other utterance object 200 is making utterance, the one utterance object 200 is caused to output voice after waiting until the end of outputting voice by the other utterance object 200. Here, in the case where the owner of the one utterance object 200 includes not only the first user but also the second user, when the other utterance object 200 owned by the first user is not making utterance, whether utterance object 200 owned by the second user is making utterance may further be determined. In this case, for example, when the other utterance object 200 owned by the first user is not making utterance and utterance object 200 owned by the second user is not making utterance, the one utterance object 200 is caused to output voice. On the other hand, when utterance object 200 owned by the second user is making utterance, the one utterance object 200 is caused to output voice after waiting until the end of outputting voice by utterance object 200 owned by the second user.

Processing Procedure

The following describes a processing procedure of the processes executed by server apparatus 100.

Figure 8:
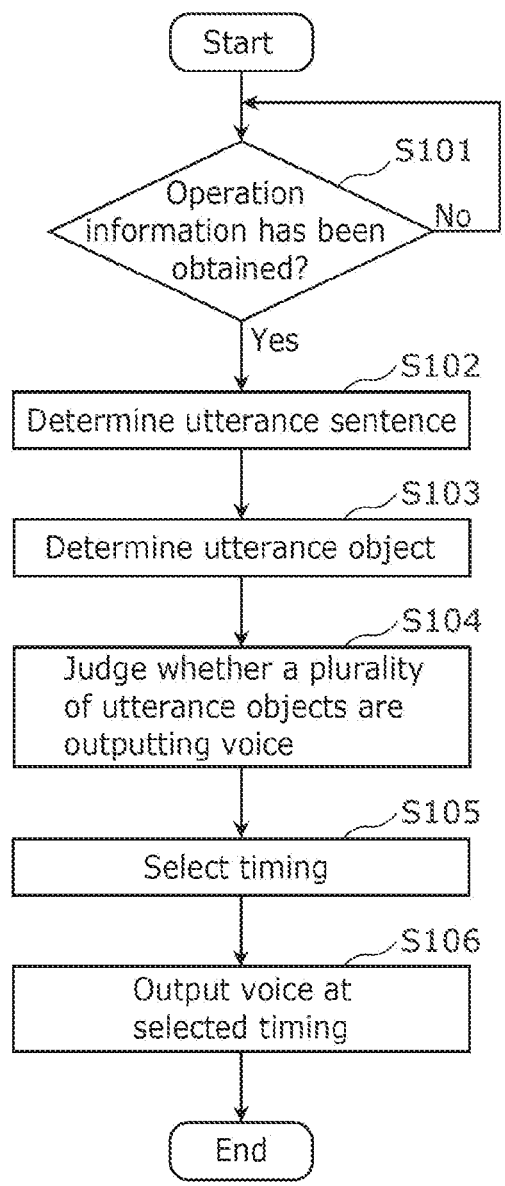
FIG. 8 is a flowchart which illustrates a processing procedure of the server apparatus according to the embodiment.

FIG. 8 is a flowchart which illustrates a processing procedure of server apparatus 100 according to the embodiment.

First, scenario determiner 120 determines whether obtainer 110 has obtained operation information of device 600 from device 600 (S101).

When scenario determiner 120 determines that obtainer 110 has not obtained operation information (No in S101), scenario determiner 120 returns to the process of Step S101.

On the other hand, when scenario determiner 120 determines that obtainer 110 has obtained operation information (Yes in S101), scenario determiner 120 determines an utterance sentence based on the operation information (S102).

Next, utterance object determiner 130, for example, determines at least one utterance object 200 which is to be caused to output via voice the utterance sentence determined by scenario determiner 120, based on the device information indicating device 600 which has performed the operation indicated by the operation information (S103).

Next, judging section 140 judges whether a plurality of utterance objects 200 (more specifically, utterance objects 200 of which utterance object information indicating utterance objects 200 are stored in storage 170) included in voice utterance system 500 are outputting voice (S104).

Next, timing determiner 150 selects, based on the results of the judgment by judging section 140, one of a timing of of immediately outputting voice and a timing of outputting voice after the end of outputting voice by a plurality of utterance objects 200 which are outputting voice, for causing one or more of the plurality of utterance objects 200 to output voice (S105). Timing determiner 150, for example, determines a timing of causing one or more of the plurality of utterance objects 200 determined by utterance object determiner 130 to output voice, by using any one of the determination methods described in the first example to the fifth example.

Next, outputter 160 causes the one or more of the plurality of utterance objects 200 determined by utterance object determiner 130 to output via voice the utterance sentence determined by scenario determiner 120 at the timing determined by timing determiner 150 (S106).

It should be noted that the information handled in Step S101 is not limited to the operation information of device 600, and may be any arbitrary information as long as the information is to be notified to the user, such as the information indicating version upgrade of device 600, the information indicating failure, etc. For the processes after step S102, an utterance sentence may also be determined based on information to be notified to the user, such as the information indicating version upgrade of device 600, the information indicating failure, etc., and utterance object 200 may be caused to output via voice the utterance sentence that has been determined.

The following describes a processing procedure of the processes executed by utterance object 200.

Figure 9:
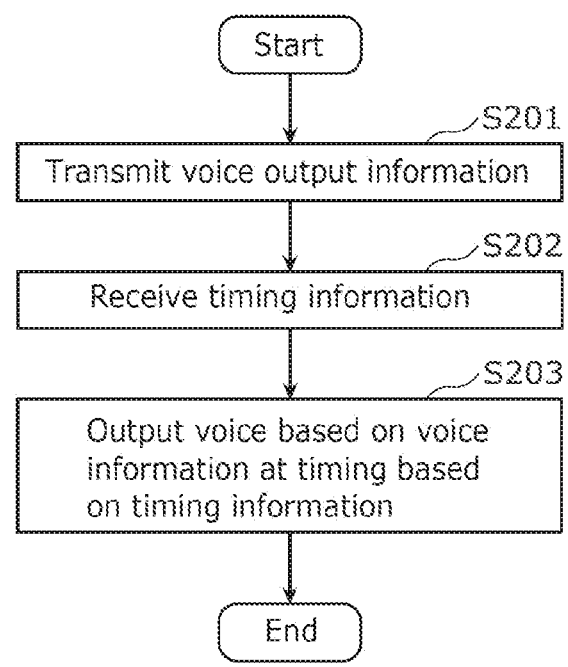
FIG. 9 is a flowchart which illustrates a processing procedure of the utterance object according to the embodiment.

FIG. 9 is a flowchart which illustrates a processing procedure of utterance object 200 according to the embodiment.

First, voice controller 220 transmits voice output information indicating whether voice outputter 230 is outputting voice, to server apparatus 100 via communicator 210 (S201). The timing of performing Step S201 by voice controller 220 is not specifically limited. Voice controller 220 may perform Step S201 repeatedly at a predetermined cycle determined arbitrarily in advance, or may perform Step S201 when information requesting voice output information is received from server apparatus 100.

It should be noted that voice controller 220 may transmit, as voice output information, information indicating an end of utterance (i.e., causing voice outputter 230 to output voice is finished), to server apparatus 100 via communicator 210.

According to this, since server apparatus 100 can recognize that utterance object 200 has been caused to start making utterance, server apparatus 100 is capable of appropriately determining whether each of utterance objects 200 is making utterance as long as it is possible for server apparatus 100 to know when the making utterance has been ended.

In addition, server apparatus 100 may determine that utterance object 200 has finished making utterance when voice output information that indicates an end of utterance is not received for a predetermined period of time.

Server apparatus 100, for example, performs Step S104 indicated in FIG. 8 based on the received voice output information, and further transmits voice information such as a voice file and timing information.

Next, voice controller 220 receives, from server apparatus 100, the voice information and the timing information that indicates a timing of outputting voice, via communicator 210 (S202).

Next, voice controller 220 causes voice outputter 230 to output voice based on the voice information at a timing based on the timing information received in Step S202 (S203).

Advantageous Effects, Etc.

As described above, a voice control method according to the embodiment includes: judging whether a plurality of utterance objects 200 are outputting voice (S104); and based on a result of the judging, causing one or more of the plurality of utterance objects 200 to output voice at one of a timing of immediately outputting voice and a timing of outputting voice after an end of outputting voice by utterance object 200 which is outputting voice among the plurality of utterance objects 200 (S106).

According to this, for example, it is possible to cause utterance object 200 to output voice while avoiding a timing which makes it difficult for a user to hear voice resulting from a plurality of utterance objects 200 outputting voice at the same time. As described above, with the voice control method according to the embodiment, it is possible to for utterance object 200 to notify information via voice at an appropriate timing.

In addition, for example, the voice control method according to the embodiment further includes: based on the result of the judging, selecting one of the timing of immediately outputting voice and the timing of outputting voice after the end of outputting voice by utterance object 200 which is outputting voice, for causing the one or more of the plurality of utterance objects 200 to output voice (S105). In this case, for example, in the causing, the one or more of the plurality of utterance objects 200 are caused to output voice at the timing selected in the selecting.

According to this, in the outputting, based on the result of the judging, it is possible to cause one or more of the plurality of utterance objects 200 to output voice at one of: the timing of immediately outputting voice; and the timing of outputting voice after the end of outputting voice by utterance object 200 which is outputting voice, for causing the one or more of the plurality of utterance objects 200 to output voice.

In addition, for example, in the selecting: the timing of immediately outputting voice is selected for causing a first utterance object that is not outputting voice among the plurality of utterance objects 20 to output voice; and for a second utterance object that is outputting voice among the plurality of utterance objects 200, the timing of outputting voice after the end of outputting voice by the second utterance object is selected for causing the second utterance object to output voice.

According to this, when an utterance sentence is to be output via voice, whether utterance object 200 is to output voice is determined according to whether utterance object 200 is currently outputting voice. For that reason, the processing of timing determination is simplified.

In addition, for example, in the selecting, when at least any one of utterance objects 200 among the plurality of utterance objects 200 is outputting voice, the timing of outputting voice after the end of outputting voice by the at least any one of utterance objects 200 is selected for causing the one or more of the plurality of utterance objects 200 to output voice.

According to this, the user can hear the same information at the same timing. As a result, it is possible to inhibit causing misunderstandings or discomfort to the user, by allowing the user to hear the same information at the same timing.

In addition, for example, the selecting includes obtaining owner information indicating an owner of each of the plurality of utterance objects 200, and in the selecting, when utterance object 200 owned by an owner of the one or more of the plurality of utterance objects 200 to be caused to output voice is outputting voice, the timing of outputting voice after the end of outputting voice by utterance object 200 owned by the owner of the one or more of the plurality of utterance objects 200 is selected for causing the one or more of the plurality of utterance objects 200 to output voice.

Of a plurality of utterance objects 200, utterance objects 200 owned by the same user are likely to output information for the user via voice. For that reason, if different utterance sentences are output via voice at the same timing from each of the plurality of utterance objects 200 owned by the same user, the user needs to listen to a plurality of pieces of information at the same time, and thus there is a possibility that the user cannot hear the information correctly. In view of the above, when utterance object 200 owned by an owner of one or more of a plurality of utterance objects 200 to be caused to output voice is outputting voice, the timing is determined such that the one or more of the plurality of utterance objects 200 is caused to output voice after the end of outputting voice by utterance object 200 owned by the owner of the one or more of the plurality of utterance objects 200. As a result, it is possible to inhibit notifying the same user of different information at the same timing.

In addition, for example, in the selecting, when utterance object 200 owned by the owner of the one or more of the plurality of utterance objects 200 is outputting voice, the timing of outputting voice after the end of outputting voice by utterance object 200 owned by the owner of the one or more of the plurality of utterance objects 200 is selected for causing the one or more of the plurality of utterance objects 200 to output voice, the owner being a user who is a target of an utterance sentence to be output via voice.

According to this, it is possible to further inhibit notifying the same user of different information at the same timing.

In addition, for example, the selecting includes obtaining owner information indicating an owner of each of the plurality of utterance objects 200, and in the selecting, when (i) the one or more of the plurality of utterance objects 200 to be caused to output voice are owned by a first user and a second user, and (ii) utterance object 200 owned by at least one of the first user or the second user among the plurality of utterance objects 200 is outputting voice, the timing of outputting voice after the end of outputting voice by utterance object 200 that is owned by the at least one of the first user or the second user and outputting voice is selected for causing the one or more of the plurality of utterance objects 200 to output voice.

For example, as illustrated in FIG. 6, when utterance object 201 owned by user A is outputting voice, if utterance object 202 owned by user A is further caused to output voice, there is a concern that it becomes difficult for user A to hear voice even if the information of voice to be output from utterance object 202 is information for user B. In view of the above, when utterance object 200 owned by at least one of the first user or the second user among the plurality of utterance objects 200 is outputting voice, the timing is determined such that one or more utterance objects 200 owned by at least one of the first user or the second user is caused to output voice after the end of outputting voice by utterance object 200 owned by at least one of the first user or the second user. As a result, it is possible to inhibit the possibility that information cannot be correctly heard for either the first user or the second user.

In addition, for example, the selecting includes, obtaining owner information indicating an owner of each of the plurality of utterance objects 200, and in the selecting, when (i) the one or more of the plurality of utterance objects 200 to be caused to output voice are owned by a first user of the first user and a second user, (ii) the second user owns at least any one of one or more utterance objects 200 owned by the first user among the plurality of utterance objects 200, and (iii) one or more utterance objects 200 owned by the second user are outputting voice, the timing of outputting voice after the end of outputting voice by the one or more utterance objects 200 owned by the second user that are outputting voice is selected for causing the one or more of the plurality of utterance objects 200 to output voice.

As illustrated in FIG. 7, for example, when user A and user B share the same utterance object 202, user A and user B are likely to be in the same space more often than not. In other words, utterance object 200 owned by user A and utterance object 200 owned by user B are likely to be placed in the same space. For that reason, when utterance object 200 owned by user A and utterance object 200 owned by user B are caused to output voice at the same time, there is a possibility that it becomes difficult to hear both the information for user A and the information for user B. In view of the above, when (i) one or more of the plurality of utterance objects 200 are owned by a first user of the first user and a second user, (ii) the second user owns at least any one of one or more utterance objects 200 owned by the first user among the plurality of utterance objects 200, and (iii) one or more utterance objects 200 owned by the second user are outputting voice, the timing is determined such that the one or more of the plurality of utterance objects 200 to be caused to output voice is to be caused to output voice after the end of outputting voice by the one or more utterance objects 200 owned by the second user. As a result, it is possible to inhibit utterance objects 200 located in the same space from being caused to output voice at the same time.

In addition, server apparatus 100 according to the embodiment includes: judging section 140 that judges, for each of a plurality of utterance objects 200 capable of outputting voice, whether utterance object 200 is outputting voice; and outputter 160 that causes, based on a result of judging by judging section 140, one or more of the plurality of utterance objects 200 to output voice at one of a timing of immediately outputting voice and a timing of outputting voice after an end of outputting voice by utterance object 200 which is outputting voice among the plurality of utterance objects 200.

According to this, it is possible to yield advantageous effects equivalent to the advantageous effects of the voice control method according to the above-described embodiment.

In addition, utterance object 200 according to the embodiment includes: voice outputter 230 that outputs voice; communicator 210 for communicating with server apparatus 100; and voice controller 220 that causes voice outputter 230 to output voice, based on voice information received from server apparatus 100 via communicator 210. In utterance object 200, voice controller 220: transmits voice output information to server apparatus 100 via communicator 210, the voice output information indicating whether voice outputter 230 is being caused to output voice; receives the voice information and timing information from server apparatus 100 via communicator 210, the timing information indicating a timing of outputting voice; and causes voice outputter 230 to output voice based on the voice information at a timing based on the timing information received.

According to this, it is possible to inhibit utterance object 200 from outputting voice based on the voice information received from server apparatus 100 together with the other voice, which makes it difficult for the user to hear the voice.

OTHER EMBODIMENTS

Although the voice control method, etc. according to the present disclosure have been described based on the exemplary embodiment thus far, the present disclosure is not limited to the embodiment described above.

For example, device 600 and utterance object 200 may be the same device or different devices. In other words, the device that transmits the device information, the operation information, etc. to server apparatus 100 and the device that outputs an utterance sentence via voice under control of server apparatus 100 may be the same device or different devices.

In addition, for example, server apparatus 100 may obtain the device information and operation information related to device 600 from another server apparatus or the like, instead of device 600. In addition, server apparatus 100 may obtain information such as transportation services used by the user of device 600, weather information, or disaster prevention information from the other server apparatus, and cause utterance object 200 to utter these information. In addition, for example, server apparatus 100 may cause utterance object 200 owned by the user to utter service information such as the above-described transportation services used by the user. For example, when server apparatus 100 receives the above-described service information from another server apparatus or the like, server apparatus 100 may cause utterance object 200 owned by the user to utter voice such as "one package is scheduled for delivery tomorrow morning." Server apparatus 100 may receive information related to the services used by the user from a smartphone, tablet terminal, personal computer, or other device owned by the user. In this case, the voice utterance system may be implemented without including device 600.

In addition, for example, server apparatus 100 may determine an utterance sentence based on the device information and operation information obtained from device 600 and information obtained from the other server apparatus. For example, when device 600 is a washing machine, server apparatus 100 may cause utterance object 200 to utter an utterance sentence which recommends drying operation of the washing machine to the user based on information indicating that the washing by the washing machine has been completed that has been obtained from the washing machine and weather information that has been obtained from the other server apparatus.

In addition, for example, the plurality of utterance objects 200 which are subjects of the judgement performed by judging section 140 may be all of utterance objects 200 included by voice utterance system 500, or the plurality of utterance objects 200 required by timing determiner 150 to determine a timing from among all of utterance objects 200 included by voice utterance system 500.

In addition, for example, in FIG. 3 to FIG. 8, an example in which user A and user B are each the owner of two utterance objects 200, and user A and user B share utterance object 202 among the plurality of utterance objects 200 has been explained. The total number of utterance objects 200 respectively owned by user A and user B, and the total number of utterance objects 200 shared by user A and user B may be one or more, same or different, and may be arbitrary.

In addition, for example, in the foregoing embodiment, the utterance object waiting to make utterance starts making new utterance after the end of utterance by an utterance object that is currently making utterance. However, one utterance object may interrupt and start making utterance during the utterance of another utterance object, depending on the details of the utterance. The details of the utterance may be determined arbitrarily in advance and is not specifically limited.

In addition, for example, in the foregoing embodiment, all or part of the structural components of the processing units such as obtainer 110, scenario determiner 120, utterance object determiner 130, etc. included by server apparatus 100 may be configured as dedicated hardware, or may be implemented by executing a software program suitable for the respective structural components. Each of the structural components may be realized by means of a program executing unit, such as a CPU and a processor, reading and executing the software program recorded on a recording medium such as a hard disk drive (HDD) or a semiconductor memory.

In addition, for example, the structural components of the above-described processing unit may each be configured by a single electronic circuit or a plurality of electronic circuits. The single electronic circuit or the plurality of electronic circuits may be each a general purpose circuitry or a dedicated circuitry.

The single electronic circuit or the plurality of electronic circuits may include, for example, a semiconductor device, an integrated circuit (IC), or a large scale integration (LSI) circuit, etc. The IC or LSI circuit may be integrated on a single chip or on a plurality of chips. Although it is referred to as an IC or LSI circuit here, it may be referred to as a system LSI circuit, a very large scale integration (VLSI) circuit, or an ultra large scale integration (ULSI) circuit, depending on the degree of integration. In addition, a field programmable gate array (FPGA), which is programmed after the LSI circuit is manufactured, can also be used for the same purpose.

In addition, all or part of the structural components of the processing unit such as voice controller 220 included by utterance object 200 may be configured as dedicated hardware, or may be implemented by executing a software program suitable for the respective structural components. Each of the structural components may be realized by means of a program executing unit, such as a CPU and a processor, reading and executing the software program recorded on a recording medium such as a hard disk drive (HDD) or a semiconductor memory.

In addition, for example, the structural components of the above-described processing unit may each be configured by a single electronic circuit or a plurality of electronic circuits.

In addition, the generic or specific aspects of the present disclosure may be realized by a system, a device, a method, an integrated circuit, or a computer program. Alternatively, the generic or specific aspects of the present disclosure may be realized by a computer-readable non-transitory recording medium such as an optical disk, HDD, or semiconductor memory on which the computer program is recorded. Alternatively, the generic or specific aspects of the present disclosure may be implemented by any combination of systems, devices, methods, integrated circuits, computer programs, and recording medium.

Other forms in which various modifications apparent to those skilled in the art are applied to the embodiment, or forms structured by combining elements of different embodiments are included within the scope of the present disclosure, unless such changes and modifications depart from the scope of the present disclosure.

INDUSTRIAL APPLICABILITY

The present disclosure is applicable to apparatuses that control devices capable of outputting voice.

The invention claimed is:

1. A voice control method performed by a processor of a server, comprising:
 judging, by the processor, for each of a plurality of electric devices capable of outputting voice, whether any of the plurality of electric devices is outputting voice;
 based on a result of the judging, selecting, by the processor, based on owner information indicating an owner of each of the plurality of electric devices, one of a first timing of immediately outputting new voice and a second timing of outputting the new voice after an end of outputting the voice by an electric device which is outputting the voice among the plurality of electric devices; and
 transmitting, by the processor through a network, a result of the selecting to one or more of the plurality of electric devices to cause the one or more of the plurality of electric devices to output the new voice at one of the first timing or the second timing,
 wherein the one or more of the plurality of electric devices are caused to output the new voice at the timing selected in the selecting, in the selecting, when (i) the one or more of the plurality of electric devices are owned by a first user, (ii) a second user owns at least any one of one or more electric devices owned by the first user among the plurality of electric devices, and (iii) one or more electric devices owned by the second user are outputting the voice, the second timing of outputting the new voice after the end of outputting the voice by the one or more electric devices owned by the second user is selected for the one or more of the plurality of electric devices to output voice, and an owner of an electronic device that is outputting voice is only the second user, and an owner of an electronic device caused to output new voice is only the first user.

2. The voice control method according to claim 1, wherein in the selecting:

the first timing is selected for a first electric device that is outputting no voice among the plurality of electric devices to output the new voice; and the second timing is selected for a second electric device that is outputting the voice among the plurality of electric devices to output the new voice.

3. The voice control method according to claim 1, wherein in the selecting, when at least any one of the plurality of electric devices is outputting the voice, the second timing of outputting the new voice after the end of outputting the voice by the at least one of plurality of electric devices is selected for causing the one or more of the plurality of electric devices to output the new voice.

4. The voice control method according to claim 1, wherein in the selecting, when a specific electric device owned by an owner of the one or more of the plurality of electric devices is outputting the voice, the second timing is selected for the one or more of the plurality of electric devices to output the new voice.

5. The voice control method according to claim 4, wherein the owner is a user who is a target of an utterance sentence to be output via the new voice.

6. The voice control method according to claim 1, wherein in the selecting, when (i) the one or more of the plurality of electric devices are owned by a first user and a second user, and (ii) a specific electric device owned by at least one of the first user or the second user among the plurality of electric devices is outputting the voice, the second timing of outputting the new voice after the end of outputting the voice by the specific electric device is selected for the one or more of the plurality of electric devices to output the new voice.

7. The voice control method according to claim 1, wherein in the selecting, even when an owner of the electric device which is outputting the voice is different from an owner of the one or more of the plurality of electric devices, the first timing is selected for the one or more of the plurality of electric devices.

8. A server apparatus comprising:

a processor programmed to perform:

judging, for each of a plurality of electric devices capable of outputting voice, whether any of the plurality of electric devices is outputting the voice; and based on a result of the judging, selecting, based on owner information indicating an owner of each of the plurality of electric devices, one of a first timing of immediately outputting new voice and a second timing of outputting the new voice after an end of outputting the voice by an electric device which is outputting the voice among the plurality of electric devices; and transmitting, through a network, a result of the selecting to one or more of the plurality of electric devices to cause the one or more of the plurality of electric devices to output the new voice at one of the first timing or the second timing, wherein the one or more of the plurality of electric devices are caused to output the new voice at the timing selected in the selecting, in the selecting, when (i) the one or more of the plurality of electric devices are owned by a first user, (ii) a second user owns at least any one of one or more electric devices owned by the first user among the plurality of electric devices, and (iii) one or more electric devices owned by the second user are outputting the voice, the second timing of outputting the new voice after the end of outputting the voice by the one or more electric devices owned by the second user is selected for the one or more of the plurality of electric devices to output voice, and an owner of an electronic device that is outputting voice is only the second user, and an owner of an electronic device caused to output new voice is only the first user.

* * * * *